April 21, 1964  R. W. SCHNEPFE, JR  3,129,663

FITTINGS FOR LOW ENERGY DETONATING CORD

Filed Aug. 11, 1961

ROBERT W. SCHNEPFE, JR.
INVENTOR.

BY
THOMAS J. HOLDEN
DONALD M. SANDLER
ATTORNEYS

United States Patent Office 3,129,663
Patented Apr. 21, 1964

3,129,663
FITTINGS FOR LOW ENERGY
DETONATING CORD
Robert W. Schnepfe, Jr., Timonium, Md., assignor to Aircraft Armaments, Inc., Cockeysville, Md., a corporation of Maryland
Filed Aug. 11, 1961, Ser. No. 130,931
1 Claim. (Cl. 102—27)

This invention relates to low energy detonating cord, and more particularly to fittings for the termination of low energy detonating cord lines.

A line of low energy detonating cord (abbreviated LEDC) contains one grain of PETN explosive mixture per foot of length. This mixture is encased in a lead sleeve that is covered with two alternate layers of braided glass fibers and polyethylene to define a cylindrical line about 0.25 inch in diameter. A detonation wave travels through the mixture with a velocity of approximately 24,000 feet per second. Despite the rapidity with which the detonation wave travels, the explosion is of such low order that the casing of the LEDC line is not ruptured. As a result, an LEDC line can be used safely without shielding, even in an explosive environment.

LEDC lines are used to initiate propellant actuated devices (abbreviated PAD), and because of their size and weight, in addition to their operating speed, are ideally suited for aircraft and missile installations where a large number of PAD's integrated into a system must be automatically initiated from a central control in some predetermined sequence. One of the problems associated with LEDC arises because of the method used to insure the transfer of detonation from one line of LEDC to one or more other lines, or to a PAD. Generally, aluminum booster cups each containing 1.5 grains of PETN, are crimped onto the free end terminations of LEDC lines. In operation, the detonation wave will travel down the LEDC line and explode the charge in the cup fragmentizing the same and producing a shower of high velocity particles of aluminum at elevated temperatures. If the cups of two LEDC lines are abutting, detonation is transferred from one line to the other. The explosion of the cup can also be utilized to initiate a PAD. The difficulty in containing the explosion of the booster cup is the problem which precludes the use of LEDC lines where the terminations are located in an inflammable atmosphere inside an aircraft or missile, or adjacent delicate and easily damaged instruments, wiring, and the like. One approach to solving this problem is to couple LEDC lines using fittings similar to high pressure hydraulic tube fittings. However, the explosion of the booster cups fractures the fittings, or shoots the LEDC lines from the fittings like bullets are shot from guns. Such fittings are not safe for use in an inflammable atmosphere or adjacent fragile components. The elongation and strengthening of a fitting to provide a high pressure chamber to contain the explosive of the booster cups is an approach sometimes successful. Aside from not being reliable, the modified fittings are heavy and bulky detracting from the advantages originally gained by the use of LEDC. Much effort has been expended by those skilled in the art to produce a fitting which does not suffer from the deficiencies above described.

It is therefore an object of this invention to provide, for the termination of an LEDC line, a fitting which while of the same general size and weight as an ordinary tube fitting, can be safely used in an inflammable atmosphere or adjacent fragile components.

As a feature of this invention, whereby the object thereof is achieved, the fitting is provided with holes for venting the explosion of a booster cup without permitting the particles of aluminum to escape the confines of the fitting. In this manner, the fitting need not be made large and heavy enough to stand the extremely high pressures produced when the charge in the booster cup explodes. As a result, the size of the fitting is reduced to that comparable to a hydraulic tube fitting for tubing of the same diameter as LEDC. To prevent the venting of aluminum particles, the holes are blocked by resilient plugs which permit the venting of the gases generated by the explosion of a booster cup but catch the aluminum particles.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claim appended hereto. Those skilled in the art will appreciate that the conception upon which this disclosure is based may readily be utilized as a basis for designing other structures for carrying out the several purposes of this invention. It is important, therefore, that the claim to be granted herein shall be of sufficient breadth to prevent the appropriation of this invention by those skilled in the art.

Figure 1:
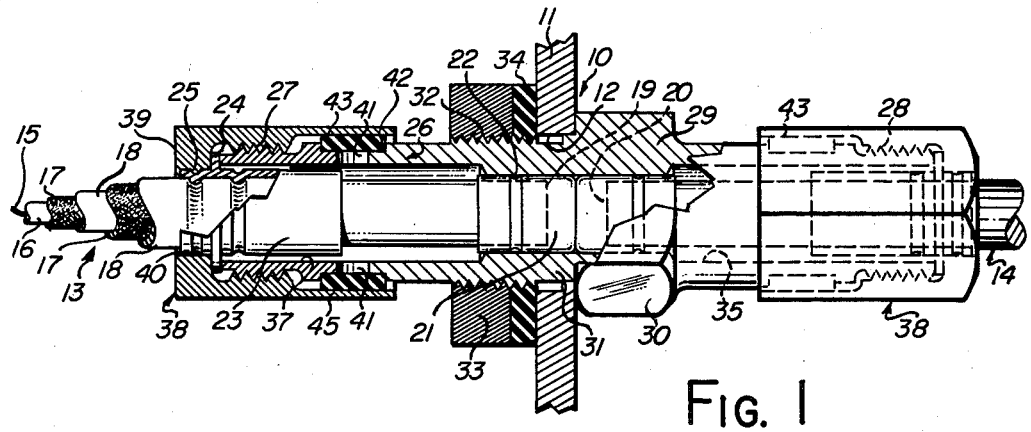
FIGURE 1 is a bulkhead coupling for connecting one LEDC line to another with parts of the coupling broken away and shown in section to better illustrate the invention.

Referring now to FIGURE 1, a coupling for connecting the terminal free ends of two LEDC lines is indicated generally at 10. Coupling 10 here takes the form of a bulkhead coupling where the bulkhead is shown at 11 with circular hole 12 therethrough. Such coupling is used because it is generally impractical to thread a single piece of LEDC line through hole 12 in bulkhead 11. Thus, coupling 10 is shown connecting one LEDC line 13 to another LEDC line 14 at bulkhead 11, although it could also be used simply to connect short runs of LEDC lines.

Each LEDC line has an explosive core 15 encased in lead tube 16 which is surrounded by two alternate layers of braided fiber glass 17 and polyethylene 18 to define a cylindrical rod-like member that is easily flexed. At the respective free ends 19 and 20 of lines 13 and 14, booster cups 21 are mounted. Cup 21 is crimped at 22 to hold the cup on the free end of the LEDC line.

Spaced from the free end of the LEDC line is clamping ferrule 23, which has an inside diameter sufficiently large to slideably fit over the line prior to crimping cup 22 on the end of the line. Ferrule 23 has circumferential flange 24 extending therearound, and is securely crimped to the line as at 25. Coupling 10 includes a generally cylindrical body 26 that has threaded ends 27 and 28. At the mid-portion of body 26 is enlarged wrench portion 29 having a plurality of flats 30 on the outer surface to enable the body to be held against rotation with an open-end wrench. Bearing portion 31 of reduced diameter is adjacent portion 29 and fits into hole 12. Portion 31 has a threaded part 32 upon which lock nut 33 is mounted. In this manner, body 26 is securely mounted on bulkhead 11 with the latter clamped between nut 33 and portion 29. Where a pressure differential exists across the bulkhead, gasket 34 or other expedient can be utilized to provide a seal for hole 12.

Extending axially in body 26 from end 27 to end 28 is bore 35 which is somewhat larger at the ends than in the middle. The middle portion 36 of bore 35 is of a diameter sufficient to slideably receive the free ends of LEDC lines 13 and 14 after caps 22 have been crimped thereon. However, the terminal portions 37 of bore 35 are smaller in diameter than flange 24 on ferrules 23. By correctly positioning the ferrules on the LEDC lines, the free ends of lines 13 and 14 may be inserted into the bore in the body until flanges 24 on the ferrules abut the ends of the body, at which position, cups 22 on ends 19 and 20 will butt, thus insuring the transfer of detonation from line 13 to line 14.

Connector cap 38 has bottom 39 with hole 40 extending therethrough. The diameter of hole 40 is smaller than that of flange 24 so that bottom 39 abuts the flange when cap 38 is screwed onto end 27 of the body. With this construction, the free end of LEDC line 13 is securely connected to body 26. The outer surface of cap 38 may be made with a plurality of flats to facilitate gripping with a wrench.

Ends 27 and 28 of body 26 are provided with a plurality of pressure relief vents 41 spaced around the periphery of the body. These vents connect portion 37 of the bore to the exterior of body 26. Vents 41 open into the bottom of groove 42 formed on the exterior of the body. Seated in groove 42 is circular rubber member 43. The bottom 39 of cap 38 is provided with cylindrical extensions 45 which, when the cap retains flange 24 to body 26, overlies member 43. It should be noted that vents 41 are located so that they lie between ferrule 23 and cup 21 when the free end of the LEDC lines are securely clamped in place to body 26. To minimize the length of extensions 45, it is desirable to have vents 41 as close as possible to ferrule 23.

In operation, it is assumed that the detonation has commenced in line 13 and is traveling from left to right as seen in FIGURE 1 toward cup 21 on end 19. The detonation wave strikes cup 21 causing it to explode. This explosion reduces the cup to fragments which strike cup 21 on end 20 of line 14 causing the latter to explode and thus transfer detonation from line 13 to line 14. Extremely high pressure gases are generated in bore 37 by the explosion of cups 21. Such gases are vented through vents 41 thereby preventing the undue stressing of body 26. Band 43 is apparently compressed against extension 45 sufficiently to permit the escape of the gases, but is still operable to catch substantially all of the aluminum fragments produced when cups 21 explode. The portion of line 13 interconnecting ferrule 23 with cup 21 completely fills bore 37 in the vicinity of ferrule 23. However, because vents 41 relieve the pressure in bore 37, ferrule 23 is sufficient to prevent the line from being shot out of hole 40 (like a bullet is shot out of a gun) when cup 21 explodes. Thus, bore 35 is effectively sealed from the compartments on either side of bulkhead 11 by the remnants of the line remaining in the bore.

It has been found experimentally, that actuation of an LEDC line having a brass booster cup on the free end will not cause an explosion in an explosive mixture of air and propane which simulates dangerous air-gasoline mixtures. When an aluminum booster cup is used, however, an explosion always resulted. Based on this, it is felt that the gases alone do not contribute to the danger of an explosion. Thus, it may be possible, when an aluminum booster cup is used, to eliminate member 43 and still achieve safe operation in an explosive environment because the aluminum particles expend a substantial amount of energy in traversing the tortuous path required to reach the environment from the bore of the coupling.

Prior to this invention, it was not always possible to retain the free end of line 13 connected to the coupling when the booster cup exploded without providing an enlarged chamber sufficiently strong to take the pressure differential that is created due to the gases released. Even with this expedient, the pressure differential tends to shoot the LEDC line from the chamber. When this occurs, the aluminum fragments escape from confinement and cause an inflammable environment to explode. However, with this invention, there is no significant pressure differential to cause detachment of the LEDC, and no aluminum particles can come in contact with the environment outside the coupling.

It should be noted that flange 24 is squeezed tightly against end 27 of the body by bottom 39 of cap 38 to provide an environmental seal at that end of the body. Rubber member 43 serves to seal vents 41 against the effects of environmental conditions. In this manner, moisture, dirt and other deleterious environmental hazards are precluded from entering bore 37. The sealing effect achieved by flange 24 and member 43 is an important factor in achieving reliable operation of the coupling.

Figure 3:
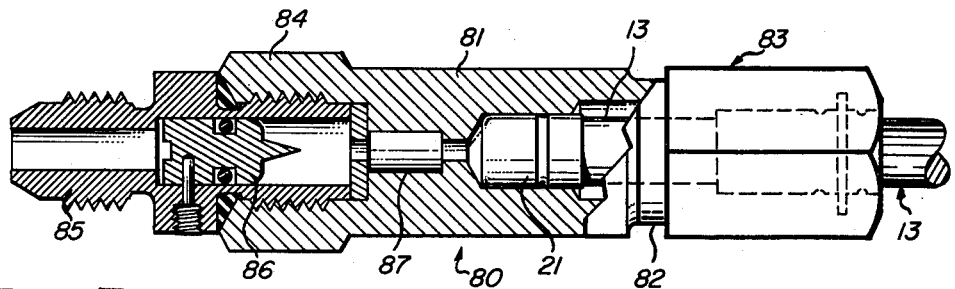
FIGURE 3 is a sectional view of a coupling for connecting an initiator to an LEDC line.
Figure 2:
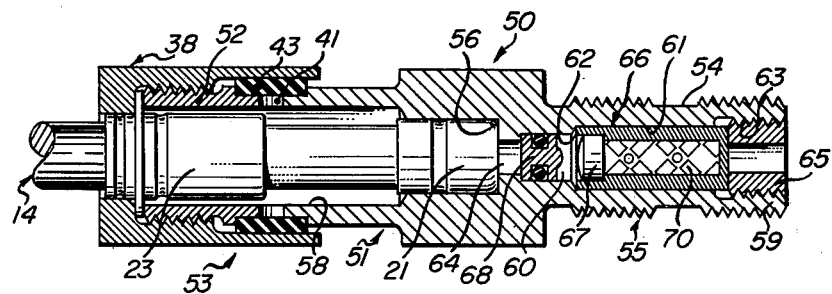
FIGURE 2 is a sectional view of a coupling for connecting an LEDC line to a firing unit that serves to fire a cartridge actuated device.

The significant structure of coupling 10, which achieves the new and improved results herein described, is the fitting at each end. Such fitting includes end 27 of body 26 in which bore 37 and vents 41 are located, rubber member 43 resiliently blocking vents 41, and cap 38 overlying member 43 and retaining ferrule 23 clamped to end 27. A fitting of this type can be applied to couplings other than those for connecting two or more LEDC lines. For example, such fitting can be applied to a coupling for connecting an LEDC line to a firing unit that serves to fire a cartridge actuated device, as shown in FIGURE 2. In addition, such fitting can also be applied to a coupling for connecting an initiator to an LEDC line, as shown in FIGURE 3.

Coupling 50 shown in FIGURE 2 includes body 51 having end 52 to which fitting 53 is applied, and end 54 to which firing unit 55 is applied. Coupling 50 may be connected to the free end of line 14 that is not shown in FIGURE 1. As previously described, the free end of the LEDC line is provided with a booster cup 21 and a ferrule 23. Cap 38 retains the flange of ferrule 23 clamped against end 52 of the coupling. Cup 21 abuts the bottom 56 of recess 57 coaxial with bore 58 in body 51.

End 54 is threaded at 59 so that the coupling can be attached to a device that is actuated by propellent gases. To this end, bore 60 in end 54 connects with recess 57 and defines a cartridge chamber 61 between a piston chamber 62 and a plug chamber 63. Aperture 64 connects recess 57 to piston chamber 62. Piston 68 is slideably mounted in chamber 62. Apertured plug 65 screwed into chamber 63 retains cartridge 66 in place against an internal shoulder in body 51, with primer cup 67 adjacent piston 64.

In operation, the detonation wave travels down line 14 (from left to right as viewed in FIGURE 2) until cup 21 explodes. Fitting 53 acts as previously described to effect the exit from bore 58 of gases generated when the cup explodes without permitting the exit of fragments of the cup. Aperture 64 permits these gases to act on piston 68 driving the same into primer 67. This sets off charge 70 contained in cartridge 66, generating propellent gases which rupture the bottom thereof and enter and operate the device to which the coupling is attached.

To fire an LEDC line using gas pressure, coupling 80 shown in FIGURE 3 can be used. Coupling 80 includes body 81 having end 82 to which fitting 83 is applied and end 84 to which initiator unit 85 is applied.

In use, a releasable source of propellent gas (not shown) is attached to unit 85. When it is desired to initiate LEDC line 13, gas is released from the source against firing pin 86. The shear pin fails and the firing pin is driven against detonator 87 causing cup 21 to explode whereby detonation is transferred to line 13. Fitting 83 functions like fitting 53 to effectively retain the line to the coupling.

It should be understood that the couplings shown in FIGURES 1 through 3 have, in common, the same type of fitting for retaining an LEDC line to the coupling. Such fitting is used to connect an LEDC line to a coupling regardless of the function of the coupling. For example, the coupling could connect an LEDC line to one or more LEDC lines, and could be connected to a bulkhead at the option of the user. An LEDC line could be terminated in a coupling so that some propellent actuated device could be operated thereby. Or, a propellent actuated device could be used to initiate an LEDC as shown in FIGURE 3.

What is claimed is:

In combination, a length of LEDC, a booster cup attached to an end of said length, a ferrule crimped to said length at a point spaced from said end, said ferrule having a circumferential flange, and a coupling to which said length is attached, said coupling comprising: a body having an axial bore that is smaller in diameter than said flange but slightly larger in diameter than the diameter of said length, said end being inserted into said bore until one side of said flange abuts said body, a cap having a hole therethrough that is smaller in diameter than said flange, said cap being attached to said body so that said length passes through said hole and said cap abuts the other side of said flange for retaining a portion of said length in said bore, pressure relief hole means in said body connecting the exterior thereof with said bore, said hole means being located between said cap and said ferrule when said portion is retained in said bore, and means resiliently blocking said hole means.

References Cited in the file of this patent

UNITED STATES PATENTS

| 1,854,518 | Little | Apr. 19, 1932 |
| 2,275,937 | Baker | Mar. 10, 1942 |
| 2,379,942 | Webber | July 10, 1945 |
| 3,020,844 | Miller | Feb. 13, 1962 |
| 3,024,728 | Trevorrow | Mar. 13, 1962 |

FOREIGN PATENTS

| 708,422 | Great Britain | May 5, 1954 |
| 855,749 | Great Britain | Dec. 7, 1960 |
| 1,241,410 | France | Aug. 8, 1960 |